(12) United States Patent
Iida

(10) Patent No.: US 12,416,569 B2
(45) Date of Patent: Sep. 16, 2025

(54) AUTOMATIC ANALYZING DEVICE

(71) Applicant: CANON MEDICAL SYSTEMS CORPORATION, Tochigi (JP)

(72) Inventor: Shin Iida, Ota-ku (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 728 days.

(21) Appl. No.: 17/651,488

(22) Filed: Feb. 17, 2022

(65) Prior Publication Data

US 2022/0283080 A1 Sep. 8, 2022

(30) Foreign Application Priority Data

Mar. 2, 2021 (JP) .................................. 2021-032250

(51) Int. Cl.
*G01N 21/27* (2006.01)
*G01N 21/25* (2006.01)
*G01N 35/02* (2006.01)

(52) U.S. Cl.
CPC ......... *G01N 21/272* (2013.01); *G01N 21/255* (2013.01); *G01N 35/025* (2013.01); *G01N 2201/0415* (2013.01)

(58) Field of Classification Search
CPC ............... G01N 21/272; G01N 21/255; G01N 21/0303; G01N 21/253; G01N 21/274; G01N 35/00; G01N 35/025; G01N 35/00584; G01N 2201/0415
USPC .......... 436/43, 45, 47, 164, 165; 422/63, 64, 422/65, 82.05, 82.09
See application file for complete search history.

(56) References Cited

U.S. PATENT DOCUMENTS

| | | | | |
|---|---|---|---|---|
| 4,338,279 A | * | 7/1982 | Orimo | G01N 21/253 422/65 |
| 4,484,817 A | * | 11/1984 | Nobuto | G01N 21/255 356/414 |
| 4,781,891 A | * | 11/1988 | Galle | G01N 35/1002 422/65 |

(Continued)

FOREIGN PATENT DOCUMENTS

| | | |
|---|---|---|
| JP | 58-7545 A | 1/1983 |
| JP | 2000-88752 A | 3/2000 |

(Continued)

OTHER PUBLICATIONS

Japanese Office Action issued Sep. 4, 2024 in Japanese Patent Application No. 2021-032250, 4 pages.

(Continued)

*Primary Examiner* — Maureen Wallenhorst
(74) *Attorney, Agent, or Firm* — Oblon, McClelland, Maier & Neustadt, L.L.P.

(57) ABSTRACT

An automatic analyzing device according to an embodiment of the present disclosure includes a rotating table, a plurality of light receiving units, and a light radiating unit. The rotating table includes a plurality of placement parts on which a plurality of reaction cuvettes are placed, respectively. The plurality of light receiving units are provided in correspondence with the plurality of placement parts, respectively. The light radiating unit is configured to change from one of the reaction cuvettes to another on which light is radiated, by changing an emission direction of the light.

1 Claim, 5 Drawing Sheets

(56) References Cited

U.S. PATENT DOCUMENTS

| | | | | |
|---|---|---|---|---|
| 6,359,284 | B1 * | 3/2002 | Hayashi | G01N 21/645 |
| | | | | 250/565 |
| 8,696,990 | B2 * | 4/2014 | Meller | G01N 21/253 |
| | | | | 422/50 |
| 11,971,295 | B2 * | 4/2024 | Iida | G01N 21/13 |

FOREIGN PATENT DOCUMENTS

| | | |
|---|---|---|
| JP | 2008-165236 A | 7/2008 |
| JP | 2009-168711 A | 7/2009 |
| JP | 2015-87185 A | 5/2015 |
| JP | 2020-51824 A | 4/2020 |

OTHER PUBLICATIONS

Office Action issued Jan. 29, 2025, in corresponding Japanese Patent Application No. 2021-032250, 4 pages.

* cited by examiner

AUTOMATIC ANALYZING DEVICE

CROSS-REFERENCE TO RELATED APPLICATIONS

This application is based upon and claims the benefit of priority from Japanese Patent Application No. 2021-032250, filed on Mar. 2, 2021; the entire contents of which are incorporated herein by reference.

FIELD

The embodiments described herein relate generally to an automatic analyzing device.

BACKGROUND

In an automatic analyzing device for a clinical test, a biological specimen (hereinafter, "specimen") such as blood or urine is mixed with a reagent in predetermined amounts to allow a reaction, so as to obtain the density, an activity value, a time period required by a change, and the like of the substance subject to a measuring process, by measuring the light quantity of transmitted light or scattered light obtained by applying light to the liquid mixture. For example, the automatic analyzing device is configured to allow a photometry unit to radiate the light, so as to perform the measuring process on the liquid being the liquid mixture provided in a reaction cuvette serving as a reaction tube.

The photometry unit includes: a light emitting unit configured to radiate the light toward the reaction cuvette; and a light receiving unit configured to detect the light that has passed through the liquid in the reaction cuvette. In this situation, the light quantity of the radiated light may vary among light emitting units. For this reason, when photometry units are provided in a quantity equal to the number of slots on which reaction cuvettes are placed on a reaction disk, it is necessary to adjust the variation in the light quantity as many times as the number of slots, for the purpose of making uniform the light quantities of the light radiated by the light emitting units of the photometry units.

DETAILED DESCRIPTION

An automatic analyzing device according to an embodiment of the present disclosure includes a rotating table, a plurality of light receiving units, and a light radiating unit. The rotating table includes a plurality of placement parts on which a plurality of reaction cuvettes are placed, respectively. The plurality of light receiving units are provided in correspondence with the plurality of placement parts, respectively. The light radiating unit is configured to change from one of the reaction cuvettes to another on which light is radiated, by changing an emission direction of the light.

Exemplary embodiments of an automatic analyzing device will be explained in detail, with reference to the accompanying drawings. Possible embodiments are not limited to the embodiments described below. Further, in principle, the description of each of the embodiments is similarly applicable to any other embodiment.

Figure 1:
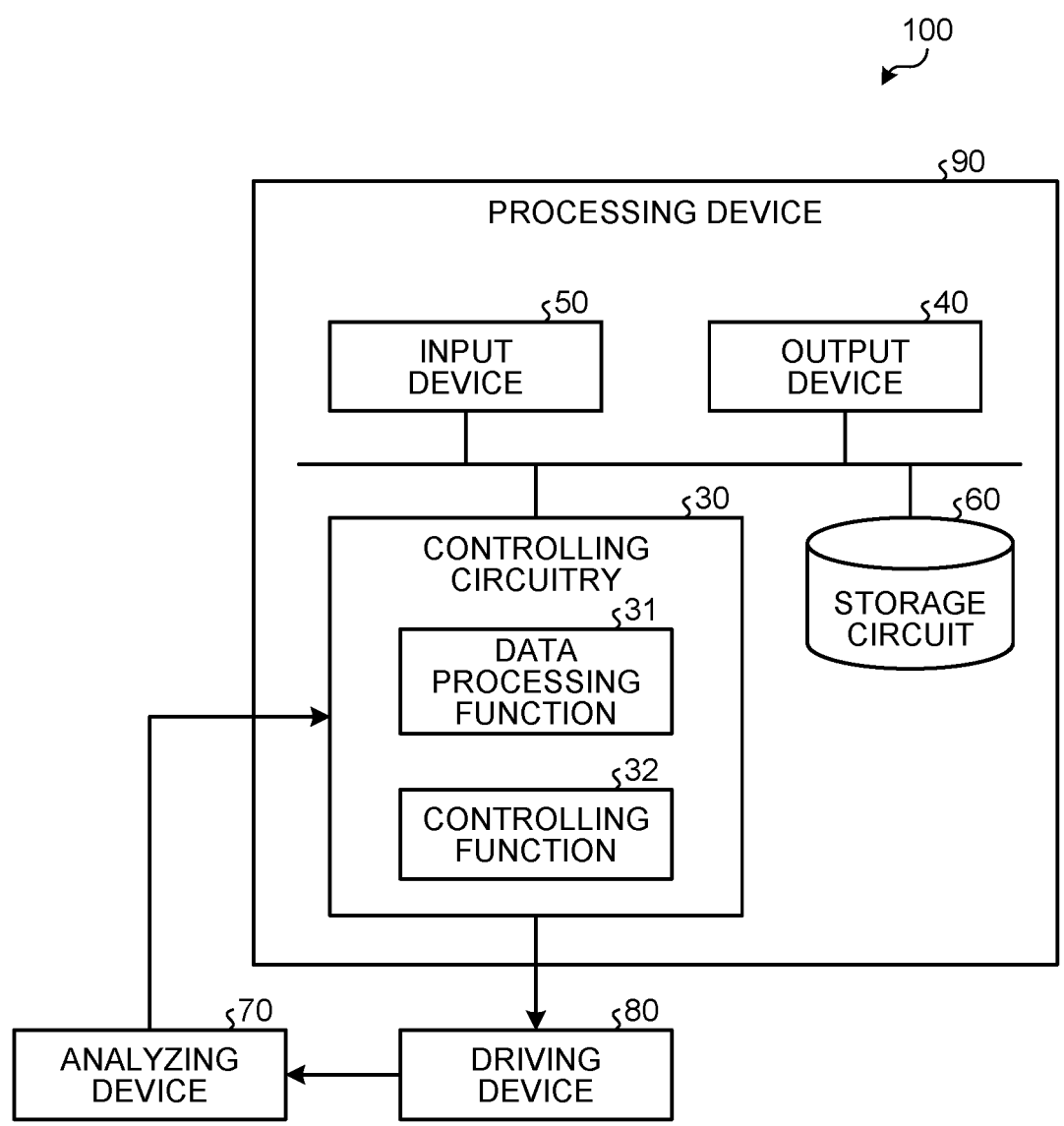
FIG. 1 is a block diagram illustrating an exemplary configuration of an automatic analyzing device according to an embodiment of the present disclosure.

FIG. 1 is a block diagram illustrating an exemplary configuration of an automatic analyzing device 100 according to the present embodiment. The automatic analyzing device 100 illustrated in FIG. 1 includes an analyzing device 70, a driving device 80, and a processing device 90.

The analyzing device 70 is configured to generate standard data and tested data, by performing a measuring process on liquid mixtures in each of which a standard specimen of any of various test items or a tested specimen (a biological specimen such as blood or urine) collected from an examined subject is mixed with a reagent used for an analysis of the test item. The analyzing device 70 includes a plurality of units configured to dispense the specimens, to dispense the reagents, and the like. The driving device 80 is configured to drive the units of the analyzing device 70. The processing device 90 is configured to bring the units of the analyzing device 70 into operation, by controlling the driving device 80.

The processing device 90 includes an input device 50, an output device 40, a controlling circuitry 30, and a storage circuit 60.

The input device 50 includes inputting devices such as a keyboard, a mouse, a button, a touch key panel, and/or the like and is configured to input information for setting analysis parameters of the test items and to input information for setting tested identification information and the test items of the tested specimen.

The output device 40 includes a printer and a display device. The printer is configured to print data generated by the controlling circuitry 30. The display device is a monitor using a Cathode Ray Tube (CRT), a liquid crystal panel, or the like and is configured to display data generated by the controlling circuitry 30.

The storage circuit 60 is, for example, a semiconductor memory element such as a Random Access Memory (RAM) or a flash memory, or a storage device such as a hard disk or an optical disk.

The controlling circuitry 30 is configured to control the entirety of a system. For example, as illustrated in FIG. 1, the controlling circuitry 30 is configured to execute a data processing function 31 and a controlling function 32. The controlling function 32 is configured to bring the units of the analyzing device 70 into operation, by controlling the driving device 80. In this situation, the controlling function 32 is an example of a controlling unit. The data processing function 31 is configured to generate calibration data and analysis data of each of the test items, by processing the standard data and the tested data generated by the analyzing device 70.

For example, the standard data generated by the analyzing device 70 denotes data (a calibration curve or a standard curve) for determining an amount or the density of a substance. The tested data generated by the analyzing device 70 denotes data of a result from the measuring process performed on the tested specimen. Further, the calibration data output from the controlling circuitry 30 denotes data indicating a result of the measuring process such as the amount or the density of the substance derived from the tested data and the standard data. The analysis data output from the controlling circuitry 30 denotes data indicating a result of determining positive or negative. In other words, the calibration data is data for deriving the analysis data indicating the result of determining positive or negative.

In this situation, for example, processing functions executed by constituent elements of the controlling circuitry 30 are recorded in the storage circuit 60 in the form of computer-executable programs. The controlling circuitry 30 is a processor configured to realize the functions corresponding to the programs by reading and executing the programs from the storage circuit 60. In other words, the controlling circuitry 30 that has read the programs has the functions illustrated within the controlling circuitry 30 in FIG. 1.

Although the example is explained with reference to FIG. 1 in which the single controlling circuit (the controlling circuitry 30) realizes the processing functions described below, it is also acceptable to structure a processing circuit by combining together a plurality of independent processors, so that the functions are realized as a result of the processors executing the programs.

The term "processor" used in the above explanations denotes, for example, a Central Processing Unit (CPU), a Graphics Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). When the processor is a CPU, for example, the processor realizes the functions by reading and executing the programs saved in the storage circuit 60. In contrast, when the processor is an ASIC, for example, instead of the programs being saved in the storage circuit 60, the programs are directly incorporated in the circuit of the processor. Further, the processors of the present embodiments do not each necessarily have to be structured as a single circuit. It is also acceptable to structure one processor by combining together a plurality of independent circuits, so as to realize the functions thereof. Further, it is also acceptable to integrate two or more of the constituent elements in FIG. 1 into a single processor, so as to realize the functions thereof.

Figure 2:
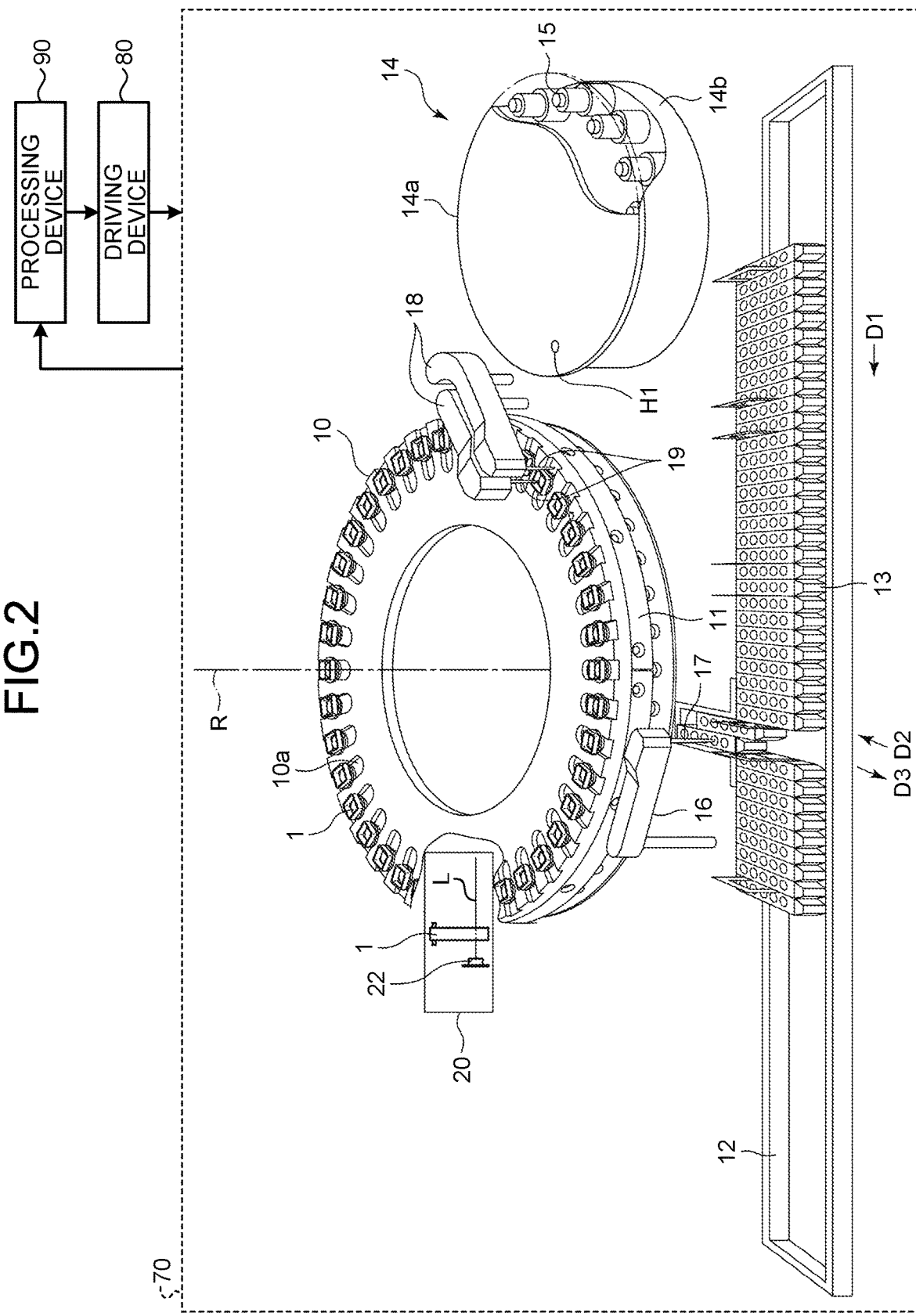
FIG. 2 is a perspective view illustrating an exemplary configuration of an analyzing device of the automatic analyzing device in FIG. 1.

FIG. 2 is a perspective view illustrating an exemplary configuration of the analyzing device 70 of the automatic analyzing device 100 in FIG. 1.

For example, the analyzing device 70 is used for a blood coagulation test. The analyzing device 70 includes a reaction disk 10, a constant temperature part 11, a rack sampler 12, and a reagent storage 14.

The reaction disk 10 includes a plurality of slots 10a on which reaction cuvettes 1 serving as reaction tubes are placed. Further, the reaction disk 10 rotates on a rotation axis R extending parallel to the vertical direction. The plurality of slots 10a are provided while being arranged along a circumferential direction centered on the rotation axis R of the reaction disk 10. Each of the slots 10a is a groove recessed downward from the top face of the reaction disk 10. As the reaction cuvettes 1 are placed on the slots 10a, the reaction disk 10 holds the plurality of reaction cuvettes 1 that are arranged in an annular formation. As a result of driving of the driving device 80 so as to repeatedly alternate between rotating and stopping at predetermined time intervals while the reaction cuvettes 1 are held on the reaction disk 10, the reaction disk 10 transports the reaction cuvettes 1 held thereby. In this situation, the reaction disk 10 is an example of the rotating table, whereas the slots 10a are an example of the placement parts.

The constant temperature part 11 has stored therein a heat medium set to a predetermined temperature and is configured to increase the temperature of a liquid mixture contained in the reaction cuvettes 1 by immersing the reaction cuvettes 1 in the heat medium being stored.

The rack sampler 12 is configured to movably support specimen racks 13 each capable of holding a plurality of specimen containers that contain specimens for which a measuring process was requested. FIG. 2 illustrates the specimen racks 13 each capable of holding five specimen containers arranged in a row.

The rack sampler 12 is provided with a first region where each of the specimen racks 13 is transported from an input position in which the specimen rack 13 is input, to a collection position in which the specimen rack 13 on which the measuring process has been completed is collected. In the first region, the plurality of specimen racks 13 arranged in the longitudinal direction are driven by the driving device 80 so as to be moved in a direction D1.

Further, the rack sampler 12 is provided with a second region where each of the specimen racks 13 is drawn in from the first region, so that the specimen containers held by the specimen rack 13 are moved to a predetermined sample suction position. The sample suction position is provided, for example, in the position where a rotation track of a sample dispensing probe (explained later) intersects a moving track of an opening part of each of the specimen containers supported by the rack sampler 12 and held by the specimen rack 13. In the second region, each of the specimen racks 13 that has been transported is driven by the driving device 80 so as to be moved in a direction D2.

Further, the rack sampler 12 is provided with a third region where each of the specimen racks 13 holding the specimen containers from which the specimens were aspirated out is returned to the first region. In the third region, each of the specimen racks 13 is driven by the driving device 80 so as to be moved in a direction D3.

The reagent storage 14 is configured to keep cool a plurality of reagent containers 15 each storing therein a reagent or the like used for the various test items performed on the standard liquid and the specimens. The reagent storage 14 includes a reagent storage cover 14a and a reagent rack 14b.

The reagent storage 14 is covered by the reagent storage cover 14a that is detachably attached. The reagent rack 14b is provided so as to be rotatable. The reagent rack 14b is configured to hold the plurality of reagent containers 15 placed in an annular formation. For example, the reagent containers 15 are each a columnar container made of glass. More specifically, the reagent containers 15 are each a container made of glass having the shape of a circular column or the shape of a polygonal prism that can be housed in a predetermined circular cylinder.

The analyzing device 70 further includes a sample dispensing arm 16, a sample dispensing probe 17, a reagent dispensing arm 18, and a reagent dispensing probe 19.

The sample dispensing arm 16 is provided between the reaction disk 10 and the rack sampler 12. The sample dispensing arm 16 is provided so as to be movable up and down along the vertical directions and so as to be rotatable in the horizontal direction. The sample dispensing arm 16 holds, on one end thereof, the sample dispensing probe 17.

The sample dispensing probe 17 is configured to turn in an arc form, in conjunction with the rotation of the sample dispensing arm 16. On the rotation track, the sample suction position is provided in which the specimen is aspirated out of each of the specimen containers held by the specimen racks 13 on the rack sampler 12. Further, on the rotation track of the sample dispensing probe 17, a sample dispense position is provided in which the specimen aspirated by the sample dispensing probe 17 is dispensed into each of the reaction cuvettes 1. The sample dispense position corresponds, for example, to an intersection of the rotation track of the sample dispensing probe 17 and a moving track of each of the reaction cuvettes 1 held by the reaction disk 10.

The sample dispensing probe 17 is driven by the driving device 80 so as to be moved in the up-and-down directions in the sample suction position or in the sample dispense position. Further, under control of the controlling circuitry 30, the sample dispensing probe 17 is configured to aspirate the specimen out of one of the specimen containers stopped in the sample suction position. Further, under control of the controlling circuitry 30, the sample dispensing probe 17 is configured to dispense the aspirated specimen into one of the reaction cuvettes 1 stopped in the sample dispense position.

The reagent dispensing arm 18 is provided between the reaction disk 10 and the reagent storage 14. The reagent dispensing arm 18 is provided so as to be movable up and down along the vertical directions and so as to be rotatable in the horizontal direction. The reagent dispensing arm 18 holds, on one end thereof, the reagent dispensing probe 19.

The reagent dispensing probe 19 is configured to turn in an arc form, in conjunction with the rotation of the reagent dispensing arm 18. On the rotation track, a reagent suction position H1 is provided. The reagent suction position H1 is provided in the position where the rotation track of the reagent dispensing probe 19 intersects a moving track of an opening part of each of the reagent containers 15 placed on the reagent rack 14b in the annular formation. Further, on the rotation track of the reagent dispensing probe 19, a reagent dispense position is provided in which the reagent aspirated by the reagent dispensing probe 19 is dispensed into each of the reaction cuvettes 1. For example, the reagent dispense position corresponds, for example, to an intersection of the rotation track of the reagent dispensing probe 19 and the moving track of each of the reaction cuvettes 1 held by the reaction disk 10.

The reagent dispensing probe 19 is driven by the driving device 80 so as to be moved in the up-and-down directions in the reagent suction position H1 or in the reagent dispense position on the rotation track. Further, under control of the controlling circuitry 30, the reagent dispensing probe 19 is configured to aspirate the reagent out of one of the reagent containers stopped in the reagent suction position H1. Further, under control of the controlling circuitry 30, the reagent dispensing probe 19 is configured to dispense the aspirated reagent into one of the reaction cuvettes 1 stopped in the reagent dispense position.

The analyzing device 70 further includes: a cleaning tank used for cleaning the sample dispensing probe 17 every time the dispensing of the specimen is finished; another cleaning tank used for cleaning the reagent dispensing probe 19 every time the dispensing of the reagent is finished; an agitator configured to agitate the liquid mixture in the reaction cuvettes 1; and another cleaning tank used for cleaning the agitator every time the agitation is finished.

The analyzing device 70 further includes a photometry unit 20 and a cleaning unit. The photometry unit 20 is configured to perform a measuring process on the liquid mixtures in the reaction cuvettes 1 by radiating light thereon. The cleaning unit is configured to clean the inside of the reaction cuvettes 1 on which the photometry unit 20 has finished performing the measuring process. The photometry unit 20 will be explained later.

The driving device 80 is configured to drive the units of the analyzing device 70.

The driving device 80 includes a mechanism configured to drive the rack sampler 12 of the analyzing device 70 and is configured to move the specimen racks 13. Further, the driving device 80 includes a mechanism configured to drive the reagent rack 14b of the reagent storage 14 and is configured to rotate the reagent containers 15. Further, the driving device 80 includes a mechanism configured to drive the reaction disk 10 and is configured to rotate the reaction cuvettes 1.

Further, the driving device 80 includes a mechanism configured to rotate and move up and down the sample dispensing arm 16 and is configured to move the sample dispensing arm 16 between the specimen containers and the reaction cuvettes 1. Further, the driving device 80 includes a mechanism configured to drive the sample dispensing probe 17 and is configured to allow the sample dispensing probe 17 to dispense the specimen, by causing the sample dispensing probe 17 to aspirate the specimen out of each of the specimen containers and to dispense the specimen into each of reaction cuvettes 1.

Further, the driving device 80 includes a mechanism configured to rotate and move up and down the reagent dispensing arm 18 and is configured to move the reagent dispensing arm 18 between the reagent containers 15 and the reaction cuvettes 1. Further, the driving device 80 includes a mechanism configured to drive the reagent dispensing probe 19 and is configured to allow the reagent dispensing probe 19 to dispense the reagent, by causing the reagent dispensing probe 19 to aspirate the reagent out of each of the reagent containers 15 and to dispense the reagent into each of the reaction cuvettes 1.

Figure 3:
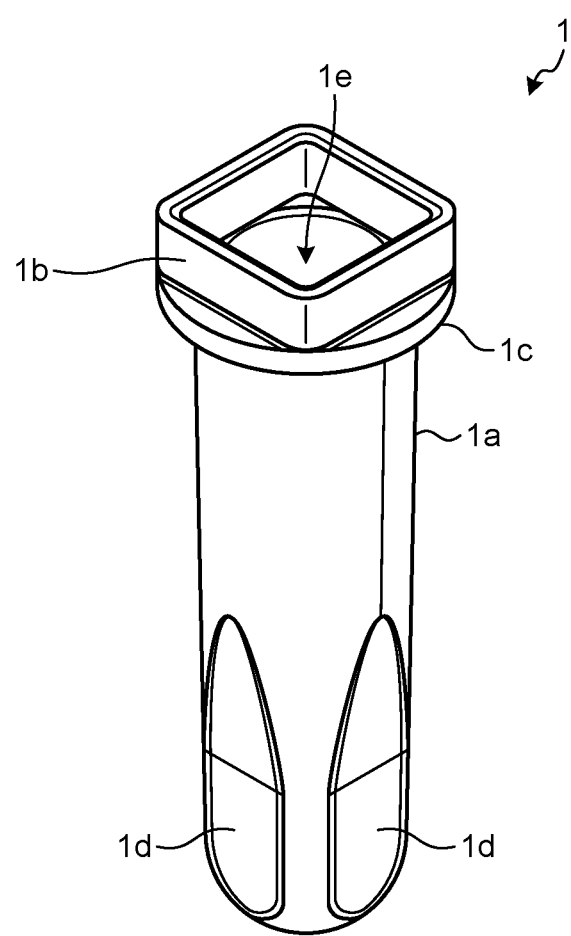
FIG. 3 is a perspective view of a reaction cuvette used in the automatic analyzing device according to the present embodiment.

Next, the reaction cuvettes 1 will be explained, with reference to FIG. 3. FIG. 3 is a perspective view of one of the reaction cuvettes 1 used in the automatic analyzing device 100 according to the present embodiment.

As illustrated in FIG. 3, the reaction cuvette 1 has a trunk part 1a, a crown part 1b, and a flange 1c.

The trunk part 1a is a member having the shape of a bottomed circular cylinder of which the top face is open. The trunk part 1a has formed therein a plurality of photometry sections 1d. For example, the trunk part 1a has formed therein four photometry sections 1d. Each of the four photometry sections 1d has a planar shape, for example.

The flange 1c is a ring-shaped member. The outside diameter of the flange 1c is larger than the outside diameter of the trunk part 1a. Further, the flange 1c is provided on the opening (1e) side of the trunk part 1a. The specimen or the reagent is dispensed into the trunk part 1a from the opening (1e) side.

The crown part 1b is a hollow member having the shape of a rectangular cylinder and has four planar faces. The four planar faces are provided so as to stand on the top face of the flange 1c. In a top view, the shape of the crown part 1b is substantially rectangular. The planar faces of the crown part 1b are provided so as to correspond to the photometry sections 1d of the trunk part 1a. The light from the photometry unit 20 illustrated in FIG. 2 is radiated onto the photometry sections 1d.

As explained above, the photometry unit 20 is configured to perform the measuring process on the liquid in the reaction cuvettes 1 by radiating the light thereon. More specifically, the photometry unit 20 is configured to measure optical property values in the liquid mixture of the specimen and the reagent dispensed in the reaction cuvette 1. Further, if photometry units 20 each included a light emitting unit configured to radiate the light toward a reaction cuvette 1 and a light receiving unit configured to detect transmitted light or scattered light obtained by applying the light to the liquid mixture in the reaction cuvette 1, while the photometry units 20 were provided in a quantity equal to the number of slots 10a on which the reaction cuvettes 1 are placed on the reaction disk 10, it would be necessary to adjust the variation in the light quantity among the light emitting units, as many times as the number of slots 10a, for the purpose of making uniform the light quantities of the light radiated by the light emitting units. Further, to adjust the variation in the light quantity among the light emitting units as many times as the number of slots 10a, adjusting the variation in the light quantity would require time and effort as well as labor costs.

Further, due to aging deterioration of the light emitting units, it might become necessary in some situations to provide a compensation circuit that compensates a decrease in the light quantity of the deteriorating light emitting units. In those situations, when the light quantity decreases due to the aging deterioration of the light emitting units even with the use of the compensation circuit, there would be a possibility that as many slots 10a as the number of deteriorating light emitting units might become unusable.

To cope with this situation, for the purpose of making it possible to perform stable analyses, the automatic analyzing device 100 according to the present embodiment includes the reaction disk 10 serving as the rotating table, the plurality of light receiving units, and a light radiating unit. The reaction disk 10 has the plurality of slots 10a on which the plurality of reaction cuvettes 1 are placed, respectively. The plurality of light receiving units are provided in correspondence with the plurality of slots 10a, respectively. The light radiating unit is configured to change from one of the reaction cuvettes 1 to another on which the light is radiated, by changing the emission direction of the light.

Figure 4:
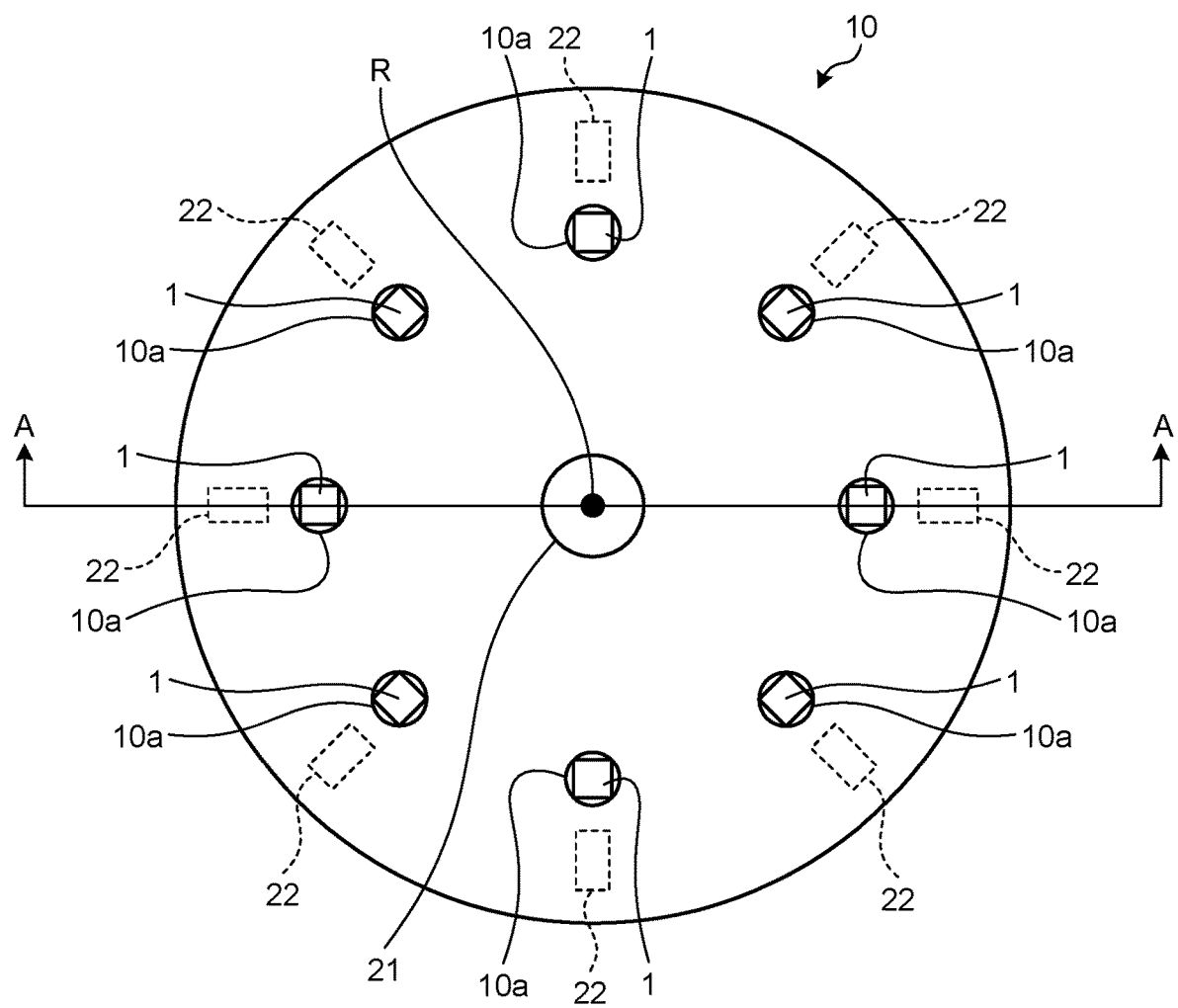
FIG. 4 is a top view of a reaction disk.

FIG. 4 is a top view of the reaction disk 10. FIG. 4 illustrates only some of the plurality of slots 10a provided on the reaction disk 10 and some the plurality of reaction cuvettes 1 held in the plurality of slots 10a. The others are omitted because the configurations thereof are the same.

The photometry unit 20 includes a light radiating unit 21 and a plurality of light receiving units 22. The single light radiating unit 21 is provided in a position corresponding to the rotation axis R of the reaction disk 10. In other words, the light radiating unit 21 is provided at the center of the reaction disk 10. In the reaction disk 10, the light radiating unit 21 is configured to emit light (the light L in FIG. 2) toward each of the plurality of reaction cuvettes 1, by changing the emission direction of the light from the center of the reaction disk 10.

The light receiving units 22 are provided in a quantity equal to the number of slots 10a of the reaction disk 10. In other words, the light receiving units 22 are provided in the quantity equal to the number of reaction cuvettes 1 held in the slots 10a of the reaction disk 10. When detecting the light transmitted through the liquid mixture in a reaction cuvette 1, the light receiving unit 22 is positioned on the outside (the outer circumferential side) of the slot 10a in terms of the radial direction. In another example, when detecting the light scattered by particles in the liquid mixture in a reaction cuvette 1, the light receiving unit 22 is positioned on the outside of the slot 10a in terms of the circumferential direction.

Figure 5:
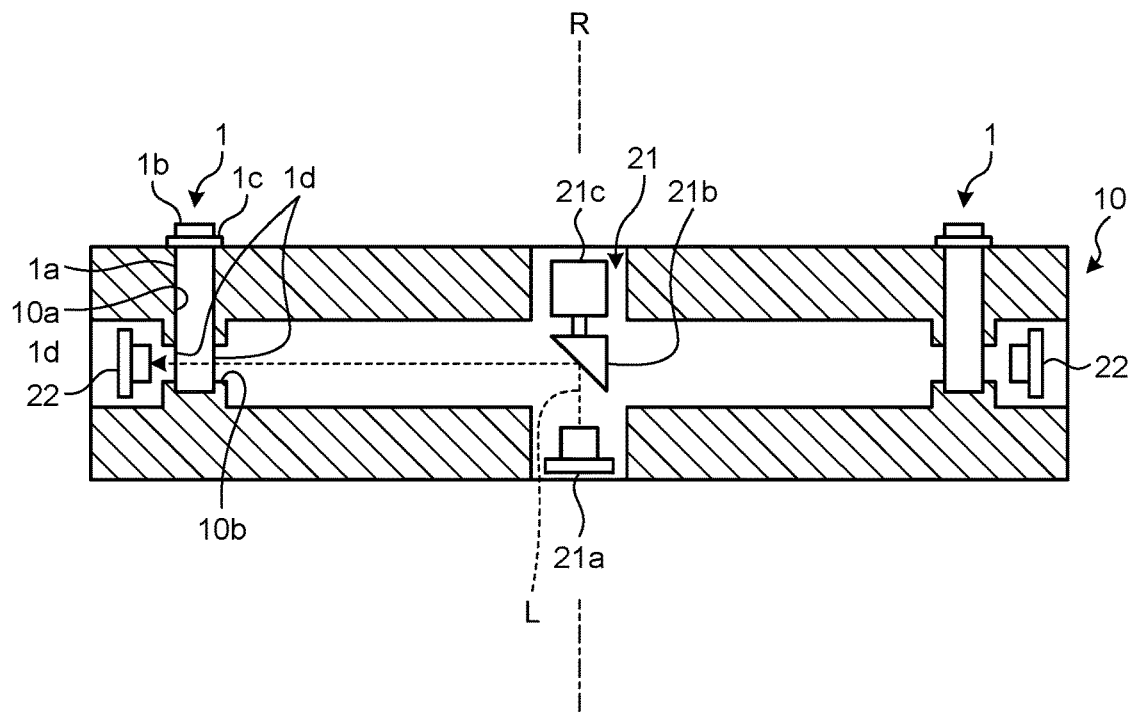
FIG. 5 is a cross-sectional view at A-A in FIG. 4.

FIG. 5 is a cross-sectional view at A-A in FIG. 4. The light radiating unit 21 includes a light emitting unit 21a, a mirror 21b, and a motor 21c. In the present embodiment, a mechanism having a single light source is realized by making the light radiating unit 21 a rotating type.

The light emitting unit 21a is provided in a position in a bottom face part of the reaction disk 10 that corresponds to the rotation axis R of the reaction disk 10. The light emitting unit 21a is, for example, a Light Emitting Diode (LED) or a laser light source and is configured to radiate the light L.

The motor 21c includes a rotation axis and a main body part configured to rotate the rotation axis. In a top face part of the reaction disk 10, the motor 21c is provided in a position corresponding to the rotation axis R of the reaction disk 10. The rotation axis of the motor 21c rotates on the same axis as the rotation axis R of the reaction disk 10. As a result of being driven by the driving device 80, the main body part of the motor 21c allows the rotation axis of the motor 21c to rotate. The motor 21c or the rotation axis of the motor 21c is an example of the rotating unit.

The mirror 21b is provided at a tip end of the rotation axis of the motor 21c. For example, the mirror 21b is configured to emit the light L toward a reaction cuvette 1, by reflecting the light L radiated from the light emitting unit 21a at a 90-degree angle. The mirror 21b is configured to rotate in conjunction with the rotation of the motor 21c. The light L emitted from the light emitting unit 21a is reflected by the mirror 21b and subsequently travels toward the slot 10a and the light receiving unit 22 along the radial direction of the reaction disk 10.

As a result, the mirror 21b emits the light L toward each of the photometry sections 1d of the plurality of reaction cuvettes 1, by reflecting the light L radiated from the light emitting unit 21a and changing the emission direction of the light L in conjunction with the rotation of the motor 21c. For example, as for the light emitting unit 21a, the mirror 21b rotates due to the rotation of the motor 21c, so that the light L is emitted onto each of the plurality of reaction cuvettes 1 at predetermined time intervals. The predetermined time intervals are, for example, intervals of 0.1 seconds.

While the reaction cuvettes 1 injected with the liquid mixture are placed on the slots 10a, the light L is emitted from the light radiating unit 21 onto the photometry section 1d of a reaction cuvette 1. In this situation, the light receiving unit 22 is configured to detect transmitted light or scattered light obtained by applying the light to the liquid mixture in the reaction cuvette 1. The light receiving unit 22 is configured to sample the detected light at predetermined time intervals (e.g., intervals of 0.1 seconds). Further, the light receiving unit 22 is configured to measure the light quantity, the intensity, and/or the like of the detected light and to output a measurement result to the controlling circuitry 30 as tested data.

Although the light emitting unit 21a is provided in the reaction disk 10 in the example in FIG. 5, the light emitting unit 21a may be provided on the outside of the reaction disk 10, for example. For instance, the reaction disk 10 may be provided with a through hole formed in a bottom face part thereof, so that the light emitting unit 21a radiates the light L from the outside of the reaction disk 10 via the through hole.

Further, although the motor 21c is provided in the reaction disk 10 in the example in FIG. 5, the main body of the motor 21c may be provided on the outside of the reaction disk 10, for example. For instance, the reaction disk 10 may be provided with a through hole formed in the top face part thereof, so that the rotation axis of the motor 21c extends therethrough.

Further, although in the example in FIG. 5 the light emitting unit 21a and the motor 21c are provided on the bottom face side and the top face side of the reaction disk 10, respectively, the opposite positional arrangement may be used. For example, the light emitting unit 21a and the motor 21c may be provided on the top face side and the bottom face side of the reaction disk 10, respectively.

As explained above, in the present embodiment, the mechanism having the single light source is realized by making the light radiating unit 21 the rotating type. In other words, in the present embodiment, the reaction disk 10 includes the plurality of slots 10a on which the plurality of reaction cuvettes 1 are placed, respectively. The plurality of light receiving units 22 are provided in correspondence with the plurality of slots 10a, respectively. The light radiating unit 21 is configured to change from one of the reaction cuvettes 1 to another on which the light L is radiated, by changing the emission direction of the light. As explained herein, according to the present embodiment, the mechanism having the single light source is realized by making the light radiating unit 21 the rotating type. As a result, the light quantity of the light emitting unit is constant, and there is no variation in the light quantity. It is therefore possible to perform stable analyses.

Further, in the present embodiment, the mechanism having the single light source is realized by making the light radiating unit 21 the rotating type. Accordingly, there is no variation in adjustment range where the light quantity of the light L radiated by the light radiating unit 21 is adjusted. Optimization of the adjustment range is thus realized. In other words, in the present embodiment, because adjusting the light quantity of the single light radiating unit 21 alone is sufficient, it is possible to set a wide dynamic range.

Further, in the present embodiment, because adjusting the light quantity of the single light radiating unit 21 alone is sufficient, it is possible to reduce the time and effort and the labor costs required by the adjustment of the variation in the light quantity.

Further, in the present embodiment, the mechanism having the single light source is realized by making the light radiating unit 21 the rotating type. Accordingly, when the single light emitting unit 21a has aged and become deteriorated, the light emitting unit 21a can be replaced. As explained herein, in the present embodiment, robustness is expected to improve, in comparison to the situation where as many slots 10a as the number of aged and deteriorated light emitting units would become unusable.

Other Embodiments

Some embodiments have thus been explained. It is, however, possible to carry out the present disclosure in various different forms other than those described in the above embodiments.

A Modification Example

Figure 6:
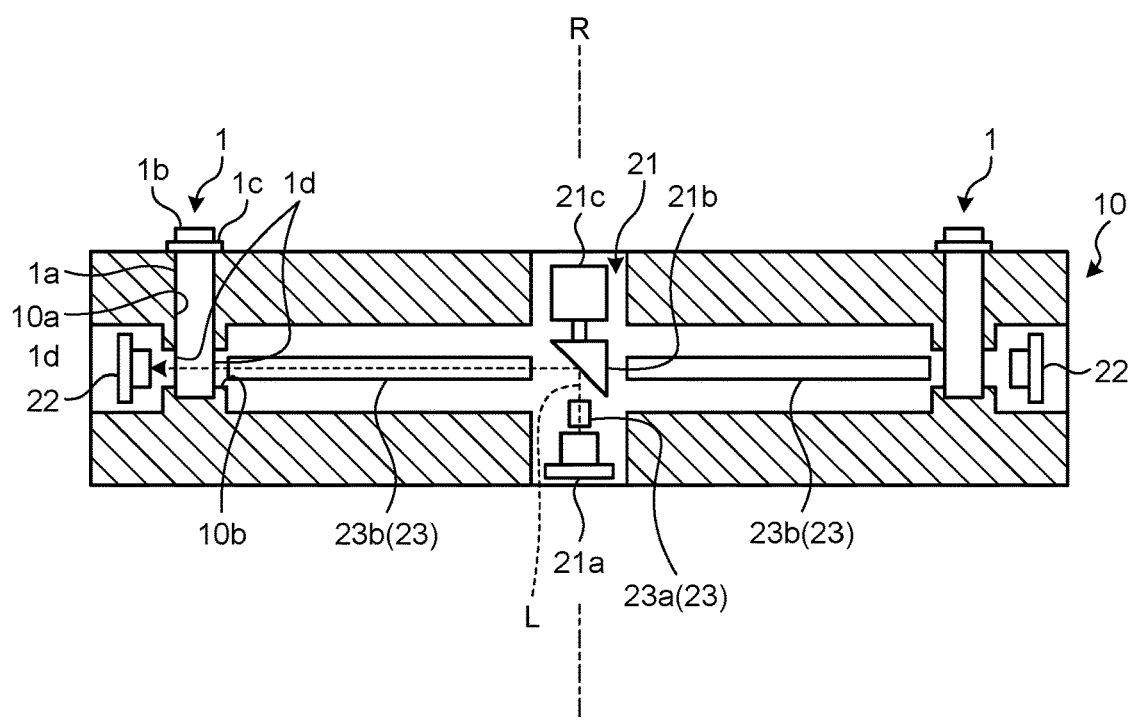
FIG. 6 is a cross-sectional view at A-A in FIG. 4 according to a modification example of the present embodiment.

In the present embodiment, for example, when the light emitting unit 21a of the light radiating unit 21 is an LED, a problem may arise where the light quantity of the light L radiated from the light emitting unit 21a attenuates, due to widening of the width of an optical path (the optical path illustrated in FIG. 5) or the like, the optical path extending from the light emitting unit 21a via the mirror 21b to each of the light receiving units 22. In that situation, in a modification example of the present embodiment, light guiding ducts 23 each having a reflection surface on the inside thereof may be provided in the reaction disk 10, as illustrated in FIG. 6.

The light guiding ducts 23 are provided in a quantity equal to the number of slots 10a of the reaction disk 10. In other words, the light guiding ducts 23 are provided in the quantity equal to the number of reaction cuvettes 1 held in the slots 10a of the reaction disk 10. For example, the light guiding ducts 23 may be optical fibers. For example, the light guiding ducts 23 include an optical fiber 23a and a plurality of optical fibers 23b. In the reaction disk 10, the optical fiber 23a is provided between the light emitting unit 21a and the mirror 21b. Each of the plurality of optical fibers 23b is provided in a different one of the spaces between the mirror 21b and the plurality of light receiving units 22.

In the present modification example of the embodiment, as a result of providing the light guiding ducts 23 in the reaction disk 10, it is possible to reduce the attenuation of the light quantity of the light L radiated from the light emitting unit 21a, so that the light L radiated from the light emitting unit 21a is guided from the light emitting unit 21a via the mirror 21b to the light receiving units 22. As explained herein, in the modification example, because the mechanism having the single light source is realized by making the light radiating unit 21 the rotating type, the light quantity of the light emitting unit becomes constant. Further, as a result of providing the light guiding ducts 23 in the reaction disk 10, the attenuation of the light quantity of the light L radiated from the light emitting unit 21a is reduced. It is therefore possible to perform stable analyses.

According to at least one aspect of the embodiments described above, it is possible to perform stable analyses.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An automatic analyzing device, comprising:
   a rotating table including a plurality of placement parts on which a plurality of reaction cuvettes are placed, respectively,
   a plurality of light receiving units provided in correspondence with the plurality of placement parts, respectively;
   a light radiating unit configured to change from one of the reaction cuvettes to another on which light is radiated, the light radiating unit including
   a rotating unit configured to rotate on a same axis as a rotation axis of the rotating table:
   a light emitting unit configured to radiate light from a center of the rotating table, and
   a mirror connected to the rotating unit and configured to change an emission direction of the light from the center of the rotating table by reflecting the light radiated from the light emitting unit, in conjunction with the rotation of the rotating unit;
   a first light guiding duct located between the light emitting unit and the mirror, wherein the first light guiding duct is configured to conduct light radiated from the light emitting unit to the mirror; and
   a plurality of second light guiding ducts (1) provided in correspondence with the plurality of placement parts, which are provided along a circumferential direction centered on the rotation axis of the rotating table, respectively, and (2) configured to guide the light received at the mirror from the light emitting unit via the first light guiding duct, to the plurality of light receiving units, wherein the plurality of second light guiding ducts are located between the mirror and each of the plurality of light receiving units.

\* \* \* \* \*